United States Patent

Skwarek et al.

[15] 3,637,151

[45] Jan. 25, 1972

[54] CONTINUOUS LOOP CARTRIDGE

[72] Inventors: Frank J. Skwarek, 9 Beacon Hill Road, Port Washington; John E. Erickson, Glenwood Landing, both of N.Y. 11050

[73] Assignee: Frank J. Skwarek, Port Washington, N.Y.

[22] Filed: Dec. 19, 1970

[21] Appl. No.: 3,595

[52] U.S. Cl. .......... 242/55.19 A, 242/71.8

[51] Int. Cl. .......... B65h 75/02

[58] Field of Search .......... 242/55.19 A, 55.19 R, 55.21, 242/55.18, 71.8; 352/128

[56] References Cited

UNITED STATES PATENTS

| | | | |
|---|---|---|---|
| 3,468,490 | 9/1969 | Knox | 242/55.19 A |
| 3,524,602 | 8/1970 | Greene | 242/55.19 A |
| 2,327,108 | 8/1943 | Heyer | 242/55.19 A |
| 2,656,184 | 10/1953 | Eddy | 242/55.19 A |
| 2,830,812 | 4/1958 | Nash et al. | 242/55.19 A |
| 3,252,670 | 5/1966 | Smith | 242/55.19 A |
| 3,311,315 | 3/1967 | Stark | 242/55.19 A |
| 3,350,025 | 10/1967 | Lear | 242/55.19 A |

FOREIGN PATENTS OR APPLICATIONS

| | | | |
|---|---|---|---|
| 656,206 | 12/1928 | France | 242/55.19 R |
| 824,383 | 11/1937 | France | 242/55.19 R |

*Primary Examiner*—Billy S. Taylor
*Attorney*—Leonard H. King

[57] ABSTRACT

A continuous tape loop is coiled in a cartridge on a rotatable turntable having a hub made of a V-shaped spring member anchored at its midportion to define semicircular yieldable arms with a gap between their free ends. The spring member also includes pairs of radially directed fingers, each pair supporting a roller to reduce friction between the hub and coil of tape. Tape is unwound from the inner coil convolution through the hub's gap, past suitable guides and a transducer head to return as the outer coil convolution. The yieldability of the hub minimizes friction between the coil turns. One end of a spring-biased brake lever normally engages one of a series of small holes provided on the turntable to lock the turntable against undesired rotation except when the tape is being used at which time tension in the tape acts on the opposite end of the lever to pivot the lever clear of the turntable.

13 Claims, 7 Drawing Figures

INVENTORS
FRANK J. SKWAREK
JOHN E. ERICKSON
BY Leonard H. King
ATTORNEY

CONTINUOUS LOOP CARTRIDGE

This invention relates to a cartridge for continuous loop recording tape and more particularly to improved hub means that minimizes and controls turn-to-turn friction in a cartridge employing a low-power tape drive motor.

BACKGROUND OF THE INVENTION

Mechanisms for supplying strips of material from a reellike pack and returning it to the same pack have existed for many years. Endless loop motion picture projectors have long been available, using a storage geometry which resembles closely that of the present invention. For some time, endless loop tape recorder cartridges have been commercially available from several manufacturers. These commercial cartridges are used primarily for "point of sale" message repeater devices in retail stores or for storing commercial announcements for radio stations.

The existence of these commercial endless loop tape cartridges and their successful use for many years did not produce a cartridge technology that could be relied on to provide reliable endless loop flight recorders. This is simply because the commercial tape cartridge does not have to have the level of reliability of the flight recorder cartridge and because it is not subjected to any kind of severe environment. The commercial and flight recorder cartridges are identical in principle. The tape is wound in each case on a one-sided reel of the sort that would be called in the motion picture industry a "flange." The tape is supplied from the center of the pack by being pulled out between the inner layer of the pack and the hub of the flange or reel. After passage through the recording mechanism it is wound up on the outside of the pack. With a simple flat flange as described, the hub of the flange follows the tape as it is pulled off and hence rotates at a speed which is the linear velocity of the tape divided by the circumference of the hub. The hub-flange combination is therefore overdriven as far as the rest of the tape pack is concerned since every other part of the pack is larger in diameter than the center. This overdriving force is that which winds the tape up on the outside of the pack.

The same geometry guarantees that every layer of the tape pack is moving at a different speed from its inside or outside neighbors. Since the tape is pulled out at a certain linear speed at the inside and wound up at the same linear speed at the outside, the linear tape speed is the same at all points. However, as the diameter of the individual layers increases gradually from the innermost to the outermost layer, the rotational velocity of each layer must correspondingly decrease. This relationship is responsible for the continuous slip.

With the geometry just described there is a holdback force opposing the pulling of the tape from the inside of the capstan, made up of whatever holdback force in the external mechanism opposes the winding up of the tape on the outside transmitted through the interlayer friction of the pack to the inside layer. If the friction between layers is high, these forces will be transmitted freely through the pack. However, if the interlayer friction, which is certain to be nonuniform from layer to layer and probably to be of the stick-slip type, is too high, the pack will probably jam. Any practical application of such a pack thus requires that there be interlayer lubrication. (No one has ever been able to reduce the interlayer friction to the point where it is too low for tape windup.) The supply and takeup forces produced by and working on the pack are thus created by a complex relationship between the rotating friction of the supporting flange and hub and the tape interlayer friction, which in turn is based on the coefficient of friction between the layers and the interlayer forces which depend on the tightness of the pack.

For the commercial application of this principle, development was largely by frustration. Endless loop tape packs always have had a reputation for jamming more easily than any other kind of tape recording equipment. Gradually a body of practical know-how on tape lubrication and pack geometry has grown up. The same process had to take place in the development of the endless loop flight recorder, but had to proceed by a somewhat more systematic route.

If the ratio of the inside to the outside diameters of an endless loop tape pack is low, that is if the ratio approximates unity, the relative velocity between layers is also low. Put simply, if $n$ is the ratio of the outside diameter to the inside diameter and there are $m$ layers, the interlayer velocity is the $m$th root of $n$ multiplied by the velocity of the outside of the pack. Early recorders (Project Vanguard, for example) used only 75 feet of tape in a very slim pack. The interlayer problems were relatively small for this recorder. As the tape length requirements grew, to 200, 300, 600 and now 1,200 feet, in as compact a recorder as possible, the interlayer problems have grown as well. In the earliest endless loop flight recorders, the tape pack performed the normal supply and takeup functions in much the same way that these must be performed for an open loop recorder. A single capstan was used which pulled the tape forward over the heads against the holdback force of the tape being pulled off the center of the pack. There is invariably a holdback force at the center no matter what the bulk of the pack does, because of the friction involved in extracting the inner layer from the space between the next layer of tape and the hub. This holdback force, however, is relatively irregular, and as the pack size grows, the irregularity grows. Thus, as larger tape packs and better tape moving performance were demanded, a basic change from the original open loop tape-metering configuration was required. The change was to the differential capstan, a configuration which placed the burden of maintaining tension across the heads entirely on two capstans, the upstream one rotating slightly faster than the downstream one. The pressure of the roller holding the tape against the upstream or supply capstan is adjusted to a force great enough to assure that this capstan does the actual metering of the tape and overcomes as far as possible irregular holdback forces in the pack. The downstream capstan, being slightly overdriven, slips continuously, with somewhat less roller pressure, to maintain the tension across the heads.

With a solid hub-flange combination, there is continuous overdrive of the flange relative to each layer of the tape in the pack, since the hub rotational rate is dependent on the minimum or inner diameter. Friction between the edges of the tape and the flange provides a force tending continuously to wind the tape up. This force is one of those involved in providing takeup of the entering section of tape on the outside of the pack. As packs increased in size the friction between the flange and the rest of the pack increased to the point where ball bearing rollers were substituted for the flange in the interest of reducing the total motor load. When rollers were substituted, much of the windup force, present with the solid flange, disappeared, since there is no positive drive from the hub to actuate the rollers. Although not a problem in medium-sized cartridges, for larger cartridge packs it was found necessary to put steps in the diameter of the rollers so as to guarantee that there would be a certain amount of overdrive to the outer layers of the tape.

Obviously, the interlayer friction problem requires that the tape have good lubricating properties and the difficulty of obtaining these properties has been one of the leading forces slowing down the development of the endless loop recorder. The mechanical interrelationships in such a device are discouragingly complex. For example, unless the interlayer friction is low enough the pack will jam up and the recorder will simply not work; the major tape takeup force, however, is generated by the interpack friction and the two influences must somehow be reconciled.

Inherent in any such recorder is a twisting and warping of the tape as it leaves the center of the pack. The effect of this distortion on the tape path must be prevented from causing flutter at the head.

The present invention overcomes the foregoing problems.

Cartridges, of the type to which the present invention is directed, are generally comprised of an endless loop or mass of magnetic recording tape coiled about a hub and mounted on a rotatable member. The tape leaves the tape mass from a position at the hub and returns at the periphery of the tape mass. Intermediate the exit and reentry positions the tape first traverses a transducer head and then drive means that are generally comprised of capstan and a pinch roller with the tape passing therebetween. Most commonly the transducer head and the drive means for the tape are part of the utilization system and not part of the cartridge.

It has long been recognized that turn-to-turn friction represents a serious cartridge problem, particularly for those utilization systems having very low power tape drive means, a high relative tape capacity, miniature system size and simplicity of operation. A comprehensive discussion of and a proposal for a solution to the friction problem may be found in U.S. Pat. No. 3,468,490, issued to Austin A. Knox on Sept. 23, 1969. As disclosed in the aforementioned patent, the prior art attempt to alleviate the turn-to-turn friction problem by the use of lubricated tape is far from completely satisfactory. Knox, on the other hand, proposes, as antifriction means, either a tapered hub or a segmented hub with each of the segments being radially movable.

The present invention provides still another solution to the turn-to-turn friction problem in endless loop magnetic tape cartridges, the structure of this invention being particularly applicable to high-performance miniature tape transports. In its broadest aspect, the present invention provides a resilient, segmented hub including roller means in each hub segment. An arc of less than 360° is defined by the segmented hub which is oriented with respect to the tape exit position such that a portion of the hub is aligned tangentially with the tape path after its exit. The aligned hub portion thus acts as an elastic spring through a hinge or pivot points. The inherent tension in the exit tape acts against the hub to automatically reduce its diameter to the point where a controlled state of dynamic equilibrium is achieved throughout the tape system.

Another aspect of this invention is the provision of an improved brake that positively halts rotation of the turntable whenever the tape is not being driven. A balanced locking lever is pivotally mounted adjacent the turntable and one end of the lever is acted upon by the tension in the exiting tape whenever the tape drive is turned on. The other end of the lever is thereby lifted out of engagement with one of a plurality of apertures formed in the periphery of the turntable. Spring means normally bias the locking end of the lever into engagement with the turntable when the tape is not moving.

A further aspect of this invention is the provision of molded plastic chutes with low friction characteristics within the tape path, especially at the points of sharp tape transition to minimize any tape-jamming tendencies during acceleration and deceleration conditions and control tape flutter effects.

Accordingly, it is an object of this invention to provide an improved endless loop tape cartridge.

An important object of this invention is to provide an improved endless loop tape cartridge for a miniature utilization system having a very low power tape transport.

A further object of this invention is to provide improved means for reducing and controlling turn-to-turn friction in an endless loop tape cartridge, as described above.

A particular object of this invention is to provide, for an endless loop tape cartridge as described above, a resilient, radially deflectable hub for the tape mass.

An additional object of this invention is to provide improved means for locking the cartridge turntable in place when the movement of the tape ceases.

A specific object of this invention is to provide an improved turntable lock that is automatically moved to the unlocked condition in response to movement of the tape.

An additional objective of this invention is to provide a tape-guiding system at those critical points of tape transition where jamming tendencies and flutter effects are apt to occur.

A feature of this invention is the provision of antifriction means integral with the cover of the cartridge.

These and other objects, features and advantages of this invention will, in part, be pointed out with particularity and will, in part, become obvious from the following, more detailed description of the invention, taken in conjunction with the accompanying drawing which forms an integral part thereof.

In the various figures of the drawing like reference characters designate like parts.

BRIEF DESCRIPTION OF THE DRAWING

Turning now to the drawing, FIGS. 1–4 illustrate one embodiment of the cartridge 10 comprising this invention. The cartridge 10 includes a formed base member 12 and a sidewall 14 extending upwardly therefrom to define a recess for the coiled loop of endless tape T. As shown particularly in FIG. 1, the sidewall 14 is stepped inwardly at 16. Slots **18*a* and 18*b* are formed in the sidewall 14 adjacent the end portions of the wall section 16** so that the tape may pass therethrough and traverse the transducer head H and then pass between the capstan C and the pinch roller P. These last three mentioned elements do not form part of the invention and are therefore shown only in phantom outline.

Figures 1, 2, 3, 4, 5, 6, 7:
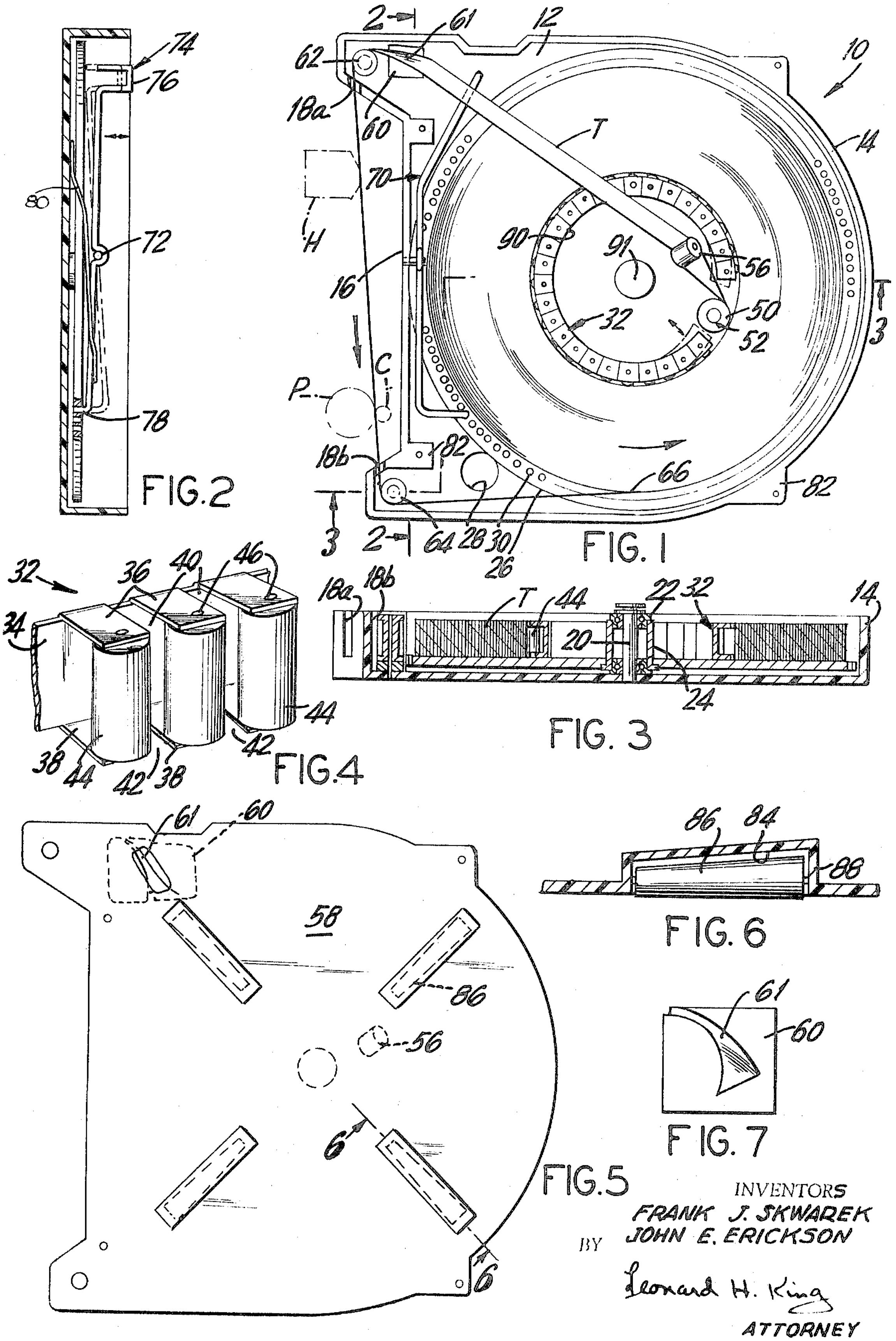
FIG. 1 is a plan view of the improved endless loop tape cartridge comprising this invention, the cover having been removed for purposes of illustration.
FIG. 2 is a sectional, side elevational view taken along line 2—2 of FIG. 1.
FIG. 3 is another sectional, side elevational view taken along line 3—3 of FIG. 1.
FIG. 4 is a developed, perspective view of a portion of the hub comprising this invention, the view being drawn to an enlarged scale for purposes of illustration.
FIG. 5 is a plan view of the cover member used with the present invention.
FIG. 6 is a fragmentary, sectional elevational view taken along line 6—6 of FIG. 5 and drawn to an enlarged scale.
FIG. 7 is a plan view of a transition piece drawn on an enlarged scale.

A spindle 20 is mounted in the member 12 and, by means of bearings 22 and a spacer 24, supports a tape turntable 26. The base member 12 is also provided with an access opening 28 through which a roller can pass from a tape recorder for direct drive of the turntable 26. This permits of a high-speed winding of the tape, when the pinch roller P is disengaged, thus allowing a rapid traverse to other portions of the tape pack while prolonging the life of the tape through nonusage of the pinch roller. For purposes to be described hereinafter, the turntable 26 also includes a plurality of small holes 30 equally spaced proximate the periphery thereof.

The hub 32 comprising this invention is comprised of a U-shaped spring member that spans an arc of less than 360°. The member 32 is constrained at 90 and is fastened to the cover member 58. As shown particularly in FIG. 4, the hub includes a peripheral wall portion 34 from which there is radially extending a plurality of upper and lower fingers 36 and 38, respectively, the fingers being separated by spaces 40 and 42, respectively. A roller 44 is journaled on a pin 46 that extends between each of the fingers 36 and 38. As shown in FIG. 1, the rollers 44 bear against the inside diameter of the tape mass.

The tape T exits from the inside diameter of the tape mass at a roller 50 journaled on a pin 52 mounted either in the end of the spring member 32 or to the cartridge cover 58. The tape T then traverses an angularly positioned transition roller 56 that is rotatably journaled in a cover member 58. Following this the tape passes through a fixed angular transition piece 60 that includes a compoundly curved slot 61 and then around a first guide roller 62 journaled in the base member 12. After traversing the transducer head H, and passing between the capstan C and the pinch roller P, the tape T travels around a second guide roller 64 journaled in the base member 12 before returning to the periphery of the tape mass proximate point 66.

A brake lever 70 is pivotally mounted on a pin 72 secured in the sidewall 14 at the inwardly stepped area 16. One end 74 of the lever 70 is bent upwardly to provide a flat surface 76 that is normally in engagement with the tape T intermediate the transition pieces 56 and 60. The other end 20 of the lever 70 includes a downwardly directed extension 78 that is positioned over the diametric centerline of the holes 30 formed near the periphery of the turntable 26. As shown in FIG. 2, one end of a leaf spring 80 is secured to the base member 12 with the other end bearing against and biasing extension 78 of the lever 70 in the direction of the holes 30 in the turntable.

The cover member 58, as shown in FIG. 5 and FIG. 6, is secured to the base member 12 by any suitable means. Pads 82 that are integral with the base member 12 provide convenient means for receiving threaded fasteners. A plurality of recesses 84 are also molded into the cover for receiving tapered rollers 86 that are journaled on pins 88. The rollers 86 bear against the top edge of the tape mass to facilitate rotary movement thereof, in other planes of position during operation.

MODE OF OPERATION

As the tape T is pulled by the cooperating action of the capstan C and the pinch roller P, the flexible hub 32 tends to collapse inwardly, using point 90 as a hinge or pivot point. The member 32 is constrained at 90 and is fastened to the cover member 58. Collapse of the hub 32 is a result of tape tension. The reduced diameter of the collapsed hub minimizes friction against the adjacent layers of the tape T proximate the hub 32, and automatically controls the cartridge tape tension. It is important to note that the line determined by point 90 and the center of the rotating turntable point 91 is substantially colinear with a tangent line common to both rollers 52 and 56. By choosing point 90 thusly, a maximum utilization of the spring member 32 is obtained without disturbing the effective center of the total mass of tape.

Once the tape T starts moving, the tension therein will provide a downward force against end 74 of the lever 70 which will then pivot about the pin 72. Downward movement of the lever end 74 causes concurrent upward movement of the extension lever 78. As the lever end moves upwardly, it will overcome the downward biasing force of the leaf spring 80 and thereby free the extension 78 from the hole 30 in which it was engaged. The turntable 26 is then free to rotate. Conversely, when the tape movement stop tension on the tape T is removed, then the leaf spring 80 will once again bias the extension 78 in a downward direction so that it seeks and engages one of the holes 30 to thereby arrest the angular movement of the turntable 26.

The formed transition piece 60 provides a very useful function. That is, it prevents the tape from kicking up and jamming during rapid acceleration and deceleration, and minimizes tape flutter. This is achieved by means of the compoundly curved slot of low surface friction with which the transition piece 60 is formed. Thus the tape T is fed to the first guide roller 62 in a plane substantially parallel to the rotational axis thereof.

From the foregoing it will be evident that an improved continuous loop tape cartridge has been provided. The cartridge is particularly useful with a high relative tape capacity, miniature low-power transport since the improved hub design minimizes the interlayer tape friction as well as controlling the system tape tension. The resilient fingerlike construction of the hub, together with the rollers therein, assures controlled deformation of the inside diameter of the tape coil when the tape is tensioned as a result of it being pulled by the tape drive means of the utilization system. The novel turntable lock is also responsive to tape tension so that the turntable is free to rotate only when the tape is moving. The close-fitting formed transition chute of low friction provides antijamming means and minimizes flutter at the most vulnerable points.

There has been disclosed heretofore the best embodiment of the invention presently contemplated. However, it is to be understood that various changes and modifications may be made by those skilled in the art without departing from the spirit of the invention.

What I claim as new and desire to secure by Letters Patent is:

1. In a continuous tape cartridge of the type including a housing and a turntable rotatable in the housing for supporting a coiled, annular tape mass, a length of the tape leaving the tape mass proximate the inner diameter thereof and returning to the tape mass proximate the outer diameter thereof, an improved brake responsive to the movement of the length of tape for unlocking the turntable, said brake comprising the combination of a plurality of holes formed in said turntable proximate the periphery thereof and a balanced lever pivotally mounted intermediate the ends thereof on said housing, a first end of said lever being positioned in the path of and adapted to be displaced through the tension in the moving tape, a second end of said lever being positioned in alignment with the holes in said turntable and normally in registration with one of said turntable holes when the tape is not moving.

2. The cartridge in accordance with claim 1 further including spring means normally biasing said second end of said lever into registration with the holes in said turntable when the length of tape is not moving.

3. An improved, continuous loop tape cartridge, particularly for use with a miniature, relatively high tape capacity, low-power tape transport system, and including a transducer head, said cartridge comprising:

a. a housing defining a recess for the tape, said housing having a wall portion adjacent which the tape is adapted to move in engagement with the transducer head;

b. means for supporting the tape in a coiled, annular mass in said housing a length of the tape leaving the tape mass proximate the inner diameter thereof and returning to the tape mass proximate the outer diameter thereof after traversing the transducer head;

c. a flexible, resilient hub hingedly secured to said means for supporting the tape at a hinge point, supporting the inside diameter of the tape mass, said hub extending between spaced ends along an arc of less than 360° and, responsive to the tension in the moving tape, being arranged to collapse in an amount proportional to the tape tension force, said hub being substantially U-shaped in transverse cross section, the two spaced legs of said U-shaped cross section having a plurality of slots formed therein to define segments, the ends of said hub being positioned approximately diametrically opposed to said hinge point of said hub; and d. a first guide member positioned intermediate the ends of said hub proximate the position at which the tape leaves the inside diameter of the tape mass and a second guide member positioned upstream of the transducer head, said first and second guide members and said hinge point of said hub member being substantially colinear.

4. In a continuous loop tape cartridge particularly adaptable to a miniature, low-power tape transport with a relatively high tape capacity, wherein the tape is coiled in an annular mass, a length of the tape leaving the tape mass proximate the inner diameter thereof and returning to the tape mass proximate the outer diameter thereof, the improvement comprising a flexible, resilient hub supporting the inside diameter of the tape mass, said hub extending between spaced ends along an arc of less than 360° and, responsive to the tension in the moving tape, being arranged to collapse about a hinge point that is substantially diametrically opposed to the position where the length of tape leaves the inner diameter of the tape mass whereby the turn-to-turn friction between adjacent layers of the coiled tape mass is minimized while simultaneously achieving a controlled and uniform state of tape tension throughout the system thereby permitting a higher state of system performance, said hub being substantially U-shaped in transverse cross section, the two spaced legs of said U-shaped cross section having a plurality of slots formed therein to define segments, the ends of said hub being positioned approximately diametrically opposed to said hinge point of said hub.

5. The cartridge in accordance with claim 4 wherein each of said segments includes a roller journaled between the two spaced legs of said hub, said rollers bearing against and supporting at least a portion of the inside diameter of the tape mass.

6. The cartridge in accordance with claim 3 wherein said means for supporting the coiled tape comprises a turntable and wherein there is further included a turntable brake for locking and unlocking said turntable, said brake being responsive to the movement of the tape to unlock said turntable, said brake otherwise locking said turntable for preventing rotation thereof in the absence of tape movement.

7. The cartridge in accordance with claim 6 wherein said brake comprises a plurality of holes formed in said turntable proximate the periphery thereof and a balanced lever pivotally mounted intermediate the ends thereof on said housing a first end of said lever being positioned in the path of and adapted to be displaced through the tension of the moving tape, a second end of said lever being positioned in alignment with the holes in said turntable and normally in registration with one of said turntable holes when the tape is not moving.

8. The cartridge in accordance with claim 7 further including spring means normally biasing said second end of said lever into registration with the holes in said turntable when the length of tape is not moving.

9. The cartridge in accordance with claim 4 wherein there is further included a first transition piece for turning the length of tape from its plane within said tape mass to a plane substantially perpendicular thereto, said first transition piece being positioned downstream of said first guide member.

10. The cartridge in accordance with claim 9 wherein said first transition piece is an angularly oriented roller positioned immediately downstream of said first guide member.

11. The cartridge in accordance with claim 9 wherein there is included a second transition piece downstream of said first transition piece for returning the length of the tape from said perpendicular plane to its original plane.

12. The cartridge in accordance with claim 11 wherein said second transition piece is a plastic block having a compoundly curved slot of restricted clearance formed therein, the length of tape being arranged to move through the slot immediately upstream of said second guide member.

13. The cartridge in accordance with claim 4 wherein each of said segments includes a roller journaled between the two spaced legs of said hub, said rollers bearing against and supporting at least a portion of the inside diameter of the tape mass.

* * * * *